United States Patent [19]
Timmerman

[11] 3,880,595
[45] Apr. 29, 1975

[54] GAS GENERATING COMPOSITIONS AND APPARATUS

[76] Inventor: Hubert G. Timmerman, 1809 Faymont Ave., Manhattan Beach, Calif. 90266

[22] Filed: Aug. 22, 1973

[21] Appl. No.: 390,435

Related U.S. Application Data

[62] Division of Ser. No. 261,041, June 8, 1972, Pat. No. 3,785,149.

[52] U.S. Cl. .............. 23/281; 60/205; 102/39; 149/15; 149/76; 149/77; 149/83; 252/188.3 R; 280/150 AB
[51] Int. Cl. ............................ B01j 7/00; C06d 5/06
[58] Field of Search ........ 23/281, 282; 280/150 AB; 60/205, 219; 102/39; 149/15, 76, 77, 83; 252/188.3 R

[56] References Cited
UNITED STATES PATENTS

| | | | |
|---|---|---|---|
| 3,305,319 | 2/1967 | Kowalick et al. | 23/281 |
| 3,515,518 | 6/1970 | Halstead et al. | 23/281 |
| 3,558,285 | 1/1971 | Ciccone et al. | 23/281 |
| 3,690,971 | 9/1972 | Gunderloy et al. | 149/76 X |
| 3,733,180 | 5/1973 | Heineck et al. | 23/281 |
| 3,773,351 | 11/1973 | Catanzarite | 23/281 X |
| 3,837,942 | 9/1974 | Catanzarite | 102/39 X |

*Primary Examiner*—Joseph Scovronek
*Assistant Examiner*—Barry I. Hollander
*Attorney, Agent, or Firm*—Christie, Parker & Hale

[57] ABSTRACT

A gas generator for inflating a bag comprising a deflagration composition yielding a gas comprising principally carbon dioxide and water vapor comprises a substantially homogeneous mixture of citric acid powder in the range of from about 23 to 37 percent by weight and an oxidizer powder selected from the group consisting of potassium chlorate, potassium perchlorate sodium chlorate, and sodium perchlorate. This composition is used adjacent a coolant powder comprising up to about 40 percent by weight of potassium chlorate and an endothermic decomposition coolant having a thermal decomposition product selected from the class consisting of carbon dioxide and water.

4 Claims, 1 Drawing Figure

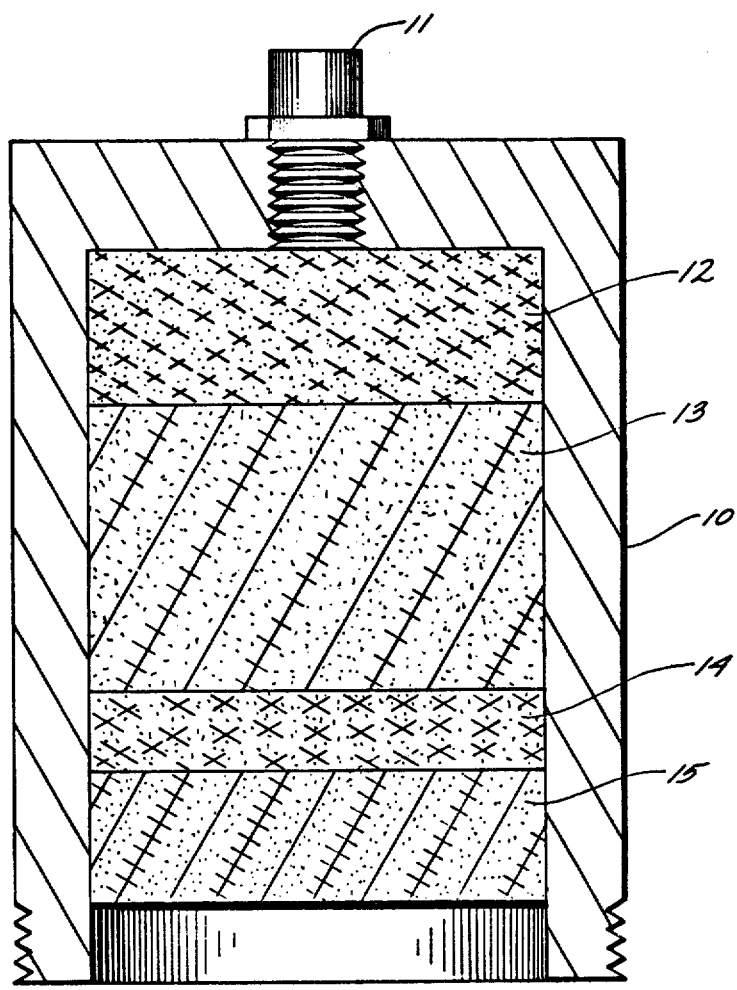

GAS GENERATING COMPOSITIONS AND APPARATUS

CROSS REFERENCE TO RELATED APPLICATIONS

This is a division of application Ser. No. 261,041, filed June 8, 1972, now U.S. Pat. No. 3,785,149.

BACKGROUND

This application is an improvement on developments described and claimed in copending U.S. Pat. Application Ser. No. 167,943, entitled "Gas Generator Composition and Method," by Hubert G. Timmerman and Vincent Catanzarite. The teachings of this patent application are hereby incorporated by reference.

Governmental requirements for automobile passenger restraint systems include an inflatable bag that momentarily and temporarily restrains a passenger during the critical instant of a collision impact. For safe and successful use the bag must be inflated in a very short time, and thereafter deflated to release the passenger. The gas used to inflate the bag must be cool enough to avoid damage to the bag and injury to the passenger. For similar reasons, it is important that hot particles do not reach the interior of the bag. The gases used must have a low toxicity, and for this reason, carbon monoxide, nitrogen oxides, sulphur compounds, and the like are undesirable. It is therefore desirable to provide compositions that burn to produce a large volume of relatively cool non-toxic gas in a very short time interval for inflating a gas bag.

The composition must be sufficiently stable to sustain the temperature, vibration, and other environmental characteristics of an automobile for a prolonged period. A specified screening test requires, for example, that the composition be maintained at 250°F for 100 hours without any degradation of performance. Such severe requirements effectively eliminate from consideration many otherwise apparently suitable materials.

BRIEF SUMMARY OF THE INVENTION

Thus, in practice of this invention according to a presently preferred embodiment, there is provided a non-toxic gas generating composition comprising an organic acid powder selected from the group consisting of citric acid in the range of from about 25 to 37 percent by weight, tartaric acid in the range of from about 20 to 42 percent by weight, tartronic acid in the range of from about 25 to 49.5 percent by weight, and malonic acid in the range of from about 20 to 36.7 percent by weight; and a balance of an oxidizer powder selected from the group consisting of potassium chlorate, potassium perchlorate, sodium chlorate, and sodium perchlorate.

DRAWING

These and other features and advantages of the present invention will be appreciated as the same becomes better understood by reference to the following detailed description of presently preferred embodiments when considered in connection with the accompanying drawing, which comprises a cross section of a gas generator cartridge employing a composition embodying principles of this invention.

DESCRIPTION

The drawing illustrates in longitudinal cross section a typical gas generator cartridge charged with a composition embodying principles of this invention. As illustrated in this presently preferred embodiment, a steel housing 10 forms a gas generator cartridge which can be threaded into a housing (not shown) or other suitable arrangement for conveying generated gases to an inflatable bag. The gas generator cartridge is open at its threaded end to permit generated gases to escape freely therefrom. If desired, a frangible or fusible protective diaphragm may be provided over the open end of the cartridge. At its closed end, the cartridge is provided with a conventional bridge wire initiator 11 and is threaded into a central opening. The initiator 11 is a conventional item wherein a "bridge wire" (not shown) is heated by an electric current when it is desired to initiate the gas generating reaction.

Packed into the housing 10 in a layer adjacent the initiator 11 is a body of propellant 12 described in greater detail hereinafter. In a typical embodiment, the layer 12 may comprise about 10 grams of propellant. Adjacent the first propellant layer 12 is an 18 gram layer of coolant 13, described in greater detail hereinafter. After the coolant layer 13, another propellant layer 14, containing five grams of propellant like that in the first layer 12, is packed on top. Finally, an eight gram layer 15 of coolant is provided over the propellant layer 14. The coolant 15 is preferably substantially the same as the first coolant layer 13. The propellant and coolant layers are preferably powders pressed in place at a pressure of less than about 5,000 psi.

The two propellant layers 12 and 14 are formed of a mixture of organic acid fuel powder and an oxidizer powder. The organic acid is in the form of a powder having a maximum average particle size less than about 15 microns. THe oxidizer powder preferably has an average particle size less than about 25 microns and is selected from the class consisting of potassium chlorate, potassium perchlorate, sodium chlorate, and sodium perchlorate. If the particle size of the organic acid is too large, the effective surface area for reaction is reduced, and the rate of reaction may not be sufficient for producing gases fast enough for inflation of an air bag in an automobile passenger restraint system. The particle size of the oxidizer powder is preferably less than about 25 microns so that the reaction rate with the fuel is rapid, and the reaction is complete. If the particle size of the oxidizer is greater than about 25 microns, unreacted particles may be ejected with the gaseous reaction products.

It is particularly preferred that the oxidizer have an average particle size less than about 15 microns, and the organic acid have an average particle size less than about five microns in order to obtain a very rapid reaction therebetween. Preferably, the particle size of the oxidizer and organic acid are about the same, that is, they do not differ from each other more than about 100 percent so that thorough and intimate mixture of the particles is obtained without substantial segregation. Segregation of the organic acid and the oxidizer powder may lead to erratic burning or yield an incomplete reaction.

The preferred composition of propellant comprises about 32 percent by weight of citric acid and 68 percent by weight of potassium chlorate. The stoichiometric reaction between citric acid and potassium chlorate is $C_6H_8O_7 + 3KClO_3 = 6CO_2 + 4H_2O + 3KCl$ and the stoichiometric proportion is 34 percent by weight of citric acid to 66 percent by weight of potassium chlorate. Thus, it will be seen that the preferred composition is 2 percent by weight rich in oxidizer as compared to the stoichiometric proportion. This composition has proved eminently successful in reducing the carbon monoxide level in the resultant gases to a very low value. This composition is preferred since it provides an optimum combination of low toxicity, cool gases, high reliability, rapid and reproducible burning rate, long term stability at 250°F without degradation of performance, and low cost. The problem of rapidly, reliably, and safely inflating an automobile passenger restraint bag is severe, and limited variation in the preferred composition has been found. The requirement that the materials be aged together at 250°F for 100 hours is severe and effectively eliminates most candidate materials. The required low carbon monoxide level and the requirement that gas temperatures into the bag be less than about 135°F further reduce possible candidate compositions.

Citric acid is advantageous since it produces a substantial volume of gas with a relatively low heat of combustion. Thus, for example, to produce equal molar quantities of gas, combustion of citric acid produces only 81 percent as much heat as combustion of sucrose. For this reason, the temperature of gas reaching the passenger restraint bag can be lower.

Some variation in the quantity of citric acid is acceptable in compositions suitable for inflating an automobile passenger restraint bag. Thus, the citric acid concentration can be as low as about 25 percent by weight and still produce a commercially acceptable embodiment. Preferably, the citric acid proportion does not drop below about 25 percent by weight since lower proportions have an undesirably low total gas output. The principal proportion of gas produced by reaction of the citric acid and oxidizer derives from the citric acid, and undue reductions in its proportion requires an increased total quantity of propellant to provide sufficient gas for an automobile passenger restraint system.

Similarly, the citric acid proportion may be increased up to about 37 percent by weight in a commercially acceptable embodiment. If the citric acid is increased above about 37 percent by weight, the carbon monoxide level in the resultant gases increases unacceptably.

A few other organic acid powders may be used in practice of this invention including tartaric acid, tartronic acid and malonic acid. Tartaric acid which has the formula $C_4H_6O_6$ reacts stoichiometricly with one and two-thirds mole of potassium chlorate to produce carbon dioxide, water vapor and potassium chloride. The stoichiometric proportion is 42 percent by weight of tartaric acid and 58 percent by weight of the oxidizer. The proportion may be decreased to about 20 percent by weight of organic acid and 80 percent oxidizer powder with acceptable performance in a gas generator for inflation of an automotive passenger restraint bag. Preferably, such a mixture is about 5 percent below stoichiometry for the organic acid and correspondingly rich in the oxidizer for suppressing carbon monoxide formation.

Tartronic acid reacts stoichiometricly with one mole of potassium chlorate to produce carbon dioxide, water vapor and potassium chloride. The stoichiometric proportion is about 49.5 percent organic acid and 50.5 percent oxidizer. The proportion of tartronic acid may be reduced to about 25 percent by weight with the oxidizer being present at about 75 percent by weight. Preferably, the composition is about 5 percent rich in oxidizer and correspondingly deficient in fuel for production of an excess of oxygen and suppression of carbon monoxide formation.

The stoichiometric reaction between malonic acid and potassium chlorate requires one and one-third moles of potassium chlorate for production of carbon dioxide and water vapor. This corresponds to about 36.7 percent by weight of the malonic acid and 63.3 percent by weight of the oxidizer. This proportion may be varied to about 20 percent by weight of malonic acid and 80 percent by weight of oxidizer powder. Preferably, the composition is about 5 percent above stoichiometry in the oxidizer and about 5 percent deficient below stoichiometry for the organic acid.

It is particularly preferred to employ potassium chlorate as the oxidizing powder since the products of reaction include potassium chloride at a sufficiently high temperature that it is molten or possibly in vapor form. Such potassium chloride principally deposits in cooler portions of a gas generator system and while so doing, entraps particles which might otherwise reach the inflatable bag. Although potassium chlorate is more sensitive than potassium perchlorate in propellant compositions, no significant safety hazards associated with its use have been identified. If such sensitivity is a problem in some applications, potassium perchlorate may be used as the oxidizer powder within principles of this invention. Potassium perchlorate is not as effective as potassium chlorate in removing hot particles from the gas stream since its melting point is about 250°C higher than the potassium chlorate. When potassium chlorate is used, it appears that a glassy layer forms on cooler surfaces (not shown) in the fluid passages leading from the gas generator cartridge to the inflatable bag. This glassy coating effectively traps particles from the gas generator cartridge and prevents them from reaching the inflatable bag. The sodium salts may be used but appear less capable of removing hot particles than the potassium salts.

Although the composition of the propellant has been stated as 100% fuel and oxidizer, it should be understood that some dilution with endothermic decomposition coolant or the like can be employed. The present requirement for passenger restraint systems has a maximum carbon monoxide level of 750 ppm in the inflating gas. It has been found that up to about 5 percent by weight dilution of the propellant with zinc carbonate remains within that limit. If a higher level of carbon monoxide is acceptable, somewhat greater dilution can be used, for example, as high as about 25 percent. It is, therefore, to be understood that the proportions of fuel and oxidizer stated in the compositions are relative to each other and up to about 5 percent of other materials may be present in the mixture.

The coolant layers 13 and 15 are preferably a mixture in the range of from about 20 to 60 percent by weight of potassium chlorate and about 40 to 80 percent by weight of zinc carbonate, both of which materials endothermically decompose when the propellant is ignited, thereby producing a substantial volume of oxygen and carbon dioxide and cooling the gases from the propellant. The presence of potassium chlorate in the coolant produces substantial quantities of potassium chloride which, as mentioned hereinabove, forms a glassy deposit on the cooler walls, thereby trapping particles of zinc oxide and the like ejected from the coolant. The resultant high concentration of oxygen in the gas from the gas generator is a bonus that helps reduce toxicity and assure complete reaction of the organic acid. Some variation in the proportion of potassium chlorate in the coolant can be employed in practice of this invention. Thus, for example, if desired the potassium chlorate can be as high as about 90 percent by weight without substantially changing effectiveness of the gas generation. Similarly, potassium chlorate can be reduced to zero if desired; however, the beneficial oxygen is concomitantly decreased and the entrapment of zinc oxide powders partially sacrificed.

If desired, potassium perchlorate can be substituted for potassium chlorate in the coolant with some decrease in the formation of a glassy deposit within the gas generator, and hence less efficacious sweeping of hot particles from the gases. Similarly sodium chlorate and sodium perchlorate may be used.

Substitution for zinc carbonate can also be provided in the coolant, although this is a preferred material. Other suitable materials may be selected from the group consisting of magnesium carbonate, manganese carbonate, barium carbonate, calcium carbonate, potassium bicarbonate, hydrated magnesium carbonate, hydrated zirconium oxide, borax, and barium oxide octahydrate. If it is acceptable to have a caustic hydroxide as a possible reaction product, sodium carbonate and sodium bicarbonate are suitable coolants. The sodium oxides remaining from decomposition of sodium carbonate and sodium bicarbonate may combine with potassium chloride to form a slag that remains in the gas generator and causes no harm in the gas bag.

A variety of compositions have been tested for suitability for practice of this invention. Some of these tests have been in the nature of screening tests where the composition was burned and the reaction observed without utilizing the gases generated. Rate and completeness of reaction are observed in unconfined burning. Experience shows that compositions burning in the same manner as successful compositions in the unconfined screening tests will perform satisfactorily in bag inflation tests. Other compositions were placed in a confined gas generator and the gases used for inflating a fabric bag. The following compositions were tested:
1. 20% tartaric acid, 80% potassium chlorate
2. 30% tartaric acid, 70% potassium chlorate
3. 38% tartaric acid, 62% potassium chlorate
4. 42% tartaric acid, 58% potassium chlorate
5. 46.5% tartaric acid, 53.5% potassium perchlorate
6. 45% tartaric acid, 55% potassium perchlorate
7. 26.6% tartaric acid, 55.4% potassium chlorate, 18% zinc carbonate
8. 22.8% tartaric acid, 53.2% potassium chlorate, 24% zinc carbonate
9. 49.5% tartronic acid, 50.5% potassium chlorate
10. 36.7% malonic acid, 63.3% potassium chlorate
11. 34.3% citric acid, 66.7% potassium chlorate
12. 32% citric acid, 68% potassium chlorate
13. 25% citric acid, 75% potassium chlorate

What is claimed is:

1. A gas generator for inflating a bag comprising:
   a pressure resistant vessel having a closed end and an open end;
   a body of compacted powders in the vessel, said body comprising
   a first portion consisting essentially of an intimate mixture of citric acid in the range of from about 25 to 37 percent by weight and the balance selected from the group consisting of potassium chlorate, potassium perchlorate, sodium chlorate, and sodium perchlorate, and
   a second portion immediately adjacent to the first portion comprising an intimate mixture of up to about 60 percent by weight of potassium chlorate and the balance selected from the group consisting of magnesium carbonate, manganese carbonate, zinc carbonate, barium carbonate, calcium carbonate, potassium bicarbonate, hydrated magnesium carbonate, hydrated zirconium oxide, borax, and barium oxide octahydrate; and
   means at the closed end of the vessel for raising a portion of the compacted powders to its autoignition temperature.

2. A gas generator as defined in claim 1 wherein the potassium chlorate in the second portion is present as about 40 percent by weight and the balance is zinc carbonate.

3. A gas generator as defined in claim 1 wherein the citric acid is present as about 32% by weight and the balance is potassium chlorate.

4. A gas generator as defined in claim 1 wherein the body of compacted powders comprises a plurality of alternating layers of the first portion and the second portion.

* * * * *